US010460610B2

(12) United States Patent
Westervelt et al.

(10) Patent No.: US 10,460,610 B2
(45) Date of Patent: Oct. 29, 2019

(54) AIRCRAFT PROFILE OPTIMIZATION WITH COMMUNICATION LINKS TO AN EXTERNAL COMPUTATIONAL ASSET

(71) Applicant: General Electric Company, Schenectady, NY (US)

(72) Inventors: Eric Richard Westervelt, Niskayuna, NY (US); MacKenzie Cumings, Grand Rapids, MI (US); Mark Lawrence Darnell, Grand Rapids, MI (US); David Lax, Grand Rapids, MI (US); Liling Ren, Niskayuna, NY (US); Nicholas Visser, Grand Rapids, MI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/282,003

(22) Filed: Sep. 30, 2016

(65) Prior Publication Data
US 2018/0096608 A1    Apr. 5, 2018

(51) Int. Cl.
G08G 5/00 (2006.01)
G05D 1/10 (2006.01)
G05D 1/00 (2006.01)

(52) U.S. Cl.
CPC ......... *G08G 5/0034* (2013.01); *G05D 1/0005* (2013.01); *G05D 1/101* (2013.01);
(Continued)

(58) Field of Classification Search
CPC .... G08G 5/0034; G08G 5/0039; G08G 1/101; G08G 5/0047; G08G 5/0091; G08G 5/0004
(Continued)

(56) References Cited

U.S. PATENT DOCUMENTS 5,181,027 A * 1/1993 Shafer ................. G01S 13/9303
340/961
5,663,732 A * 9/1997 Stangeland ............ G01C 5/005
340/979
(Continued)

OTHER PUBLICATIONS

"Canadian Office Action", dated May 31, 2019 (May 31, 2019), Canada Intellectual Property Office, for Canadian Application No. 2,979,750, 5pp.

*Primary Examiner* — Tyler J Lee
(74) *Attorney, Agent, or Firm* — Buckley, Maschoff & Talwalkar, LLC

(57) ABSTRACT

A system, computer-readable medium, and a method including obtaining flight data for a prescribed flight from at least one of an airborne system of a particular aircraft to execute the prescribed flight and a system other than the airborne system of the particular aircraft having a source of data related to the prescribed flight, the flight data including specific details relating to at least one of the particular aircraft and parameters of the prescribed flight; performing, by a processor of an external computational asset and based on the obtained flight data, a control optimization to generate optimized path specific controls for the prescribed flight; transmitting the optimized path specific controls via a communication uplink from the external computational asset to the particular aircraft; and guiding, in response to receiving the optimized path specific controls by the particular aircraft, the particular aircraft in accordance with the optimized path specific controls to execute the prescribed flight.

18 Claims, 4 Drawing Sheets

(52) U.S. Cl.
CPC ......... *G08G 5/0004* (2013.01); *G08G 5/0013* (2013.01); *G08G 5/0026* (2013.01); *G08G 5/0039* (2013.01); *G08G 5/0047* (2013.01); *G08G 5/0082* (2013.01); *G08G 5/0091* (2013.01)

(58) Field of Classification Search
USPC .......................................................... 701/2
See application file for complete search history.

(56) References Cited

U.S. PATENT DOCUMENTS

| | | | | |
|---|---|---|---|---|
| 5,920,278 | A | * | 7/1999 | Tyler .......................... G01S 5/14 |
| | | | | 342/140 |
| 6,047,165 | A | * | 4/2000 | Wright ................. G05D 1/0055 |
| | | | | 340/945 |
| 6,381,538 | B1 | * | 4/2002 | Robinson ............... G01C 23/00 |
| | | | | 701/439 |
| 6,526,337 | B2 | | 2/2003 | Gardner |
| 7,877,197 | B2 | | 1/2011 | Lewis et al. |
| 8,560,148 | B2 | | 10/2013 | Torres et al. |
| 8,798,898 | B2 | | 8/2014 | Castillo-Effen et al. |
| 8,818,696 | B2 | | 8/2014 | Klooster et al. |
| 8,924,137 | B2 | | 12/2014 | Chan et al. |
| 9,159,240 | B2 | | 10/2015 | Cornell et al. |
| 9,177,480 | B2 | | 11/2015 | Subbu et al. |

\* cited by examiner

200

205

OBTAIN FLIGHT DATA FOR A PRESCRIBED FLIGHT FROM AT LEAST ONE OF AN AIRBORNE SYSTEM OF A PARTICULAR AIRCRAFT TO EXECUTE THE PRESCRIBED FLIGHT AND A SYSTEM OTHER THAN THE AIRBORNE SYSTEM OF THE PARTICULAR AIRCRAFT, THE FLIGHT DATA INCLUDING SPECIFIC DETAILS RELATING TO AT LEAST ONE OF THE PARTICULAR AIRCRAFT AND PARAMETERS OF THE PRESCRIBED FLIGHT

210

PERFORM, BY A PROCESSOR OF AN EXTERNAL COMPUTATIONAL ASSET AND BASED ON THE OBTAINED FLIGHT DATA, A CONTROL OPTIMIZATION TO GENERATE OPTIMIZED PATH SPECIFIC CONTROLS FOR THE PRESCRIBED FLIGHT

215

TRANSMIT THE OPTIMIZED PATH SPECIFIC CONTROLS VIA A COMMUNICATION UPLINK FROM THE EXTERNAL COMPUTATIONAL ASSET TO THE PARTICULAR AIRCRAFT

220

GUIDE, IN RESPONSE TO RECEIVING THE OPTIMIZED PATH SPECIFIC CONTROLS BY THE PARTICULAR AIRCRAFT, THE PARTICULAR AIRCRAFT IN ACCORDANCE WITH THE OPTIMIZED PATH SPECIFIC CONTROLS TO EXECUTE THE PRESCRIBED FLIGHT

*FIG. 2*

AIRCRAFT PROFILE OPTIMIZATION WITH COMMUNICATION LINKS TO AN EXTERNAL COMPUTATIONAL ASSET

BACKGROUND

The field of the present disclosure relates generally to flight management, more particularly, to systems, devices and methods of operation for flight management and applications thereof.

The cost of fuel is typically a large share of the operating expense in commercial aviation. As a consequence, operating efficiency and fuel savings are driving research for improvements in aircraft design and aircraft operations. The focus is primarily on those technologies that save fuel: aircraft and engine design, control design, and flight path planning and execution (called flight guidance).

Flight Management Systems (FMS) onboard aircraft typically determine climb, cruise, and descent speeds and constant cruise altitudes in an effort to reduce or minimize Direct Operating Cost given takeoff weight and range and assuming constant thrust for climb and idle thrust for descent. These simplifying assumptions have been applied to implement practical systems, but the simplifications yield suboptimal performance and compromised fuel savings.

Therefore, there exists a need for systems and methods that improve the optimization problem for flight without simplifying assumptions to achieve guidance closer to optimum.

BRIEF DESCRIPTION

In one aspect, an embodiment of the present disclosure relates to a optimization to generate a control history and corresponding state trajectory to minimize a direct operating cost (DOC) for an airborne aircraft, including the use of a data link between one or more systems other than an airborne system of a particular aircraft and an airborne system of the particular airborne aircraft. In one embodiment, a method for optimizing aircraft guidance to minimize direct operating cost of a prescribed flight can include obtaining flight data for a prescribed flight from at least one of an airborne system of a particular aircraft to execute the prescribed flight and another system having a source of data related to the prescribed flight, the flight data including specific details relating to at least one of the particular aircraft and parameters of the prescribed flight; performing, by a processor of an external computational asset and based on the obtained flight data, a control optimization to generate optimized path specific controls for the prescribed flight; transmitting the optimized path specific controls via a communication uplink from the external computational asset to the particular aircraft; and guiding, in response to receiving the optimized path specific controls by the particular aircraft, the particular aircraft in accordance with the optimized path specific controls to execute the prescribed flight.

In other embodiments, a system may implement, execute, or embody at least some of the features of the processes herein. In yet another example embodiment, a tangible medium may implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein:

FIG. 2 is an illustrative example of a flow diagram of a process, according to some aspects herein;

Figure 3:
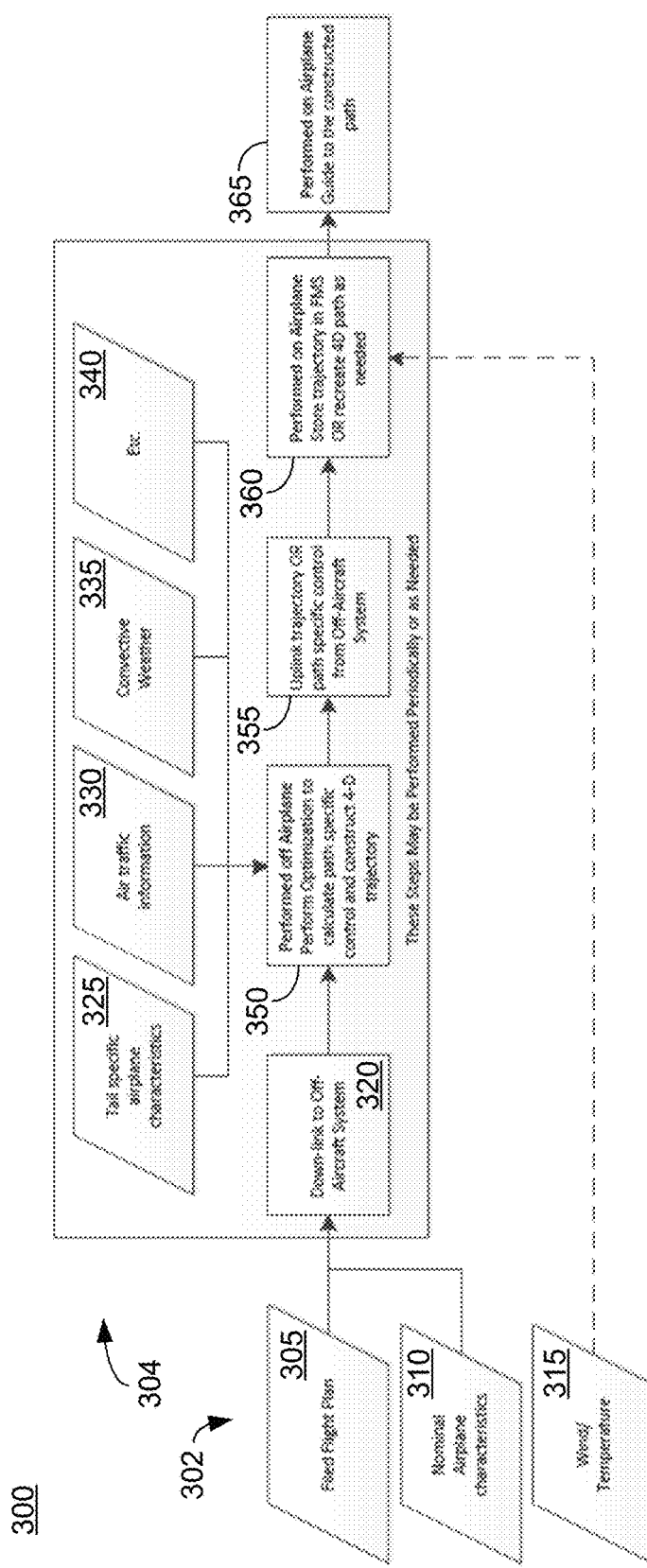
Figure 4:
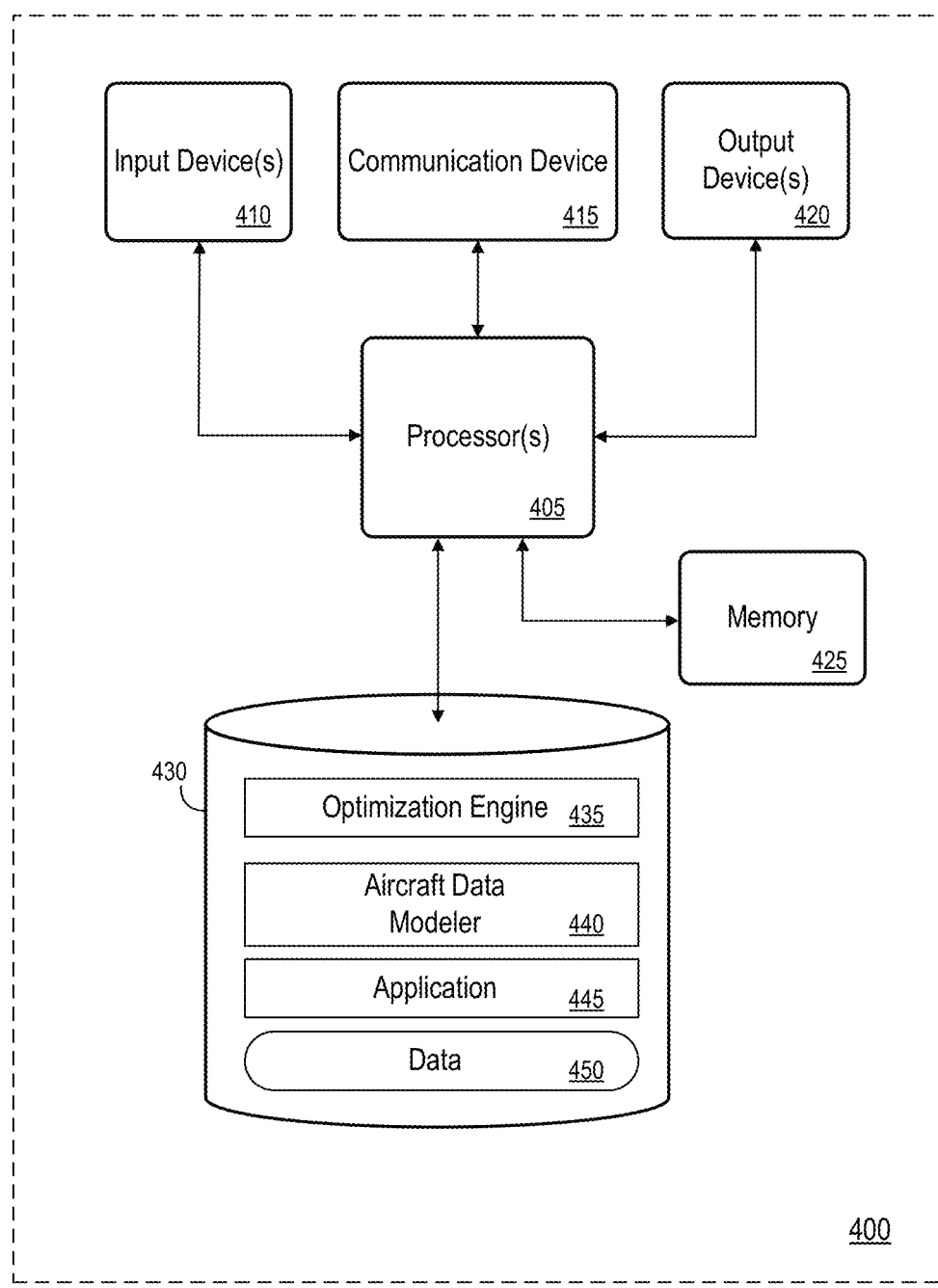

FIG. 3 is an illustrative depiction of a framework including data flows, according to some aspects herein; and FIG. 4 is and illustrative depiction of a block diagram of a system or device that can support some processes disclosed herein Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

A conventional Flight Management System (FMS) of an aircraft in service today generally determines aspects of a flight path, including but not limited to, climb, cruise, and descent speeds and altitudes, as well as a partial or complete trajectory or flight plan. At least some of the data used by the FMS to generate the flight path (or aspects and portions thereof) can be received from a ground-based source. For example, a baseline flight plan filed for an aircraft may be received by the FMS and used in determining an "optimized" or, more accurately, a somewhat tuned flight plan for an aircraft of the general type being flown. Additional and/or other data such as, for example, wind and temperature data and nominal aircraft characteristics for the aircraft may also be received and used by the FMS to calculate the flight plan that may be used for guidance by the aircraft. In some aspects, the flight plan calculated by the FMS may be determined using broad/general statistics and measures for the aircraft, where the statistical data may represent an average or mean for the aircraft that will fly the calculated flight path. For example, a lookup table or other predetermined static values including averaged control data values (e.g., "economy" control speeds and altitudes, etc.) may be referenced by the FMS (or other entity) and used by the aircraft's on-board FMS to construct a so-called "optimized" four-dimensional (4-D including latitude, longitude, altitude, and time) trajectory for the aircraft using the "economy" control targets, wherein the calculated trajectory may be used to guide the aircraft to the constructed path in a prescribed time frame. For example, the calculated trajectory may include commands to guide the aircraft from 30 k feet to 40 k feet by a certain time by changing aircraft settings, including for example, engine settings and other aircraft flight controls to achieve the commanded values.

In some aspects however, the resultant flight plan calculated by the airborne/on-board FMS (or other) system(s)

may not produce a truly optimized flight plan that can reliably and/or efficiently performed to minimize intended DOC. For example, the scope and specificity of the flight data (i.e., its level of customization to the specific flight plan, aircraft, weather and air traffic conditions, etc.) considered and even capable of being received, processed, stored, reported, and acted on by flight management (and other) systems on-board aircraft may be limited by the processing power, memory, and connectivity capabilities of those systems.

Figure 1:
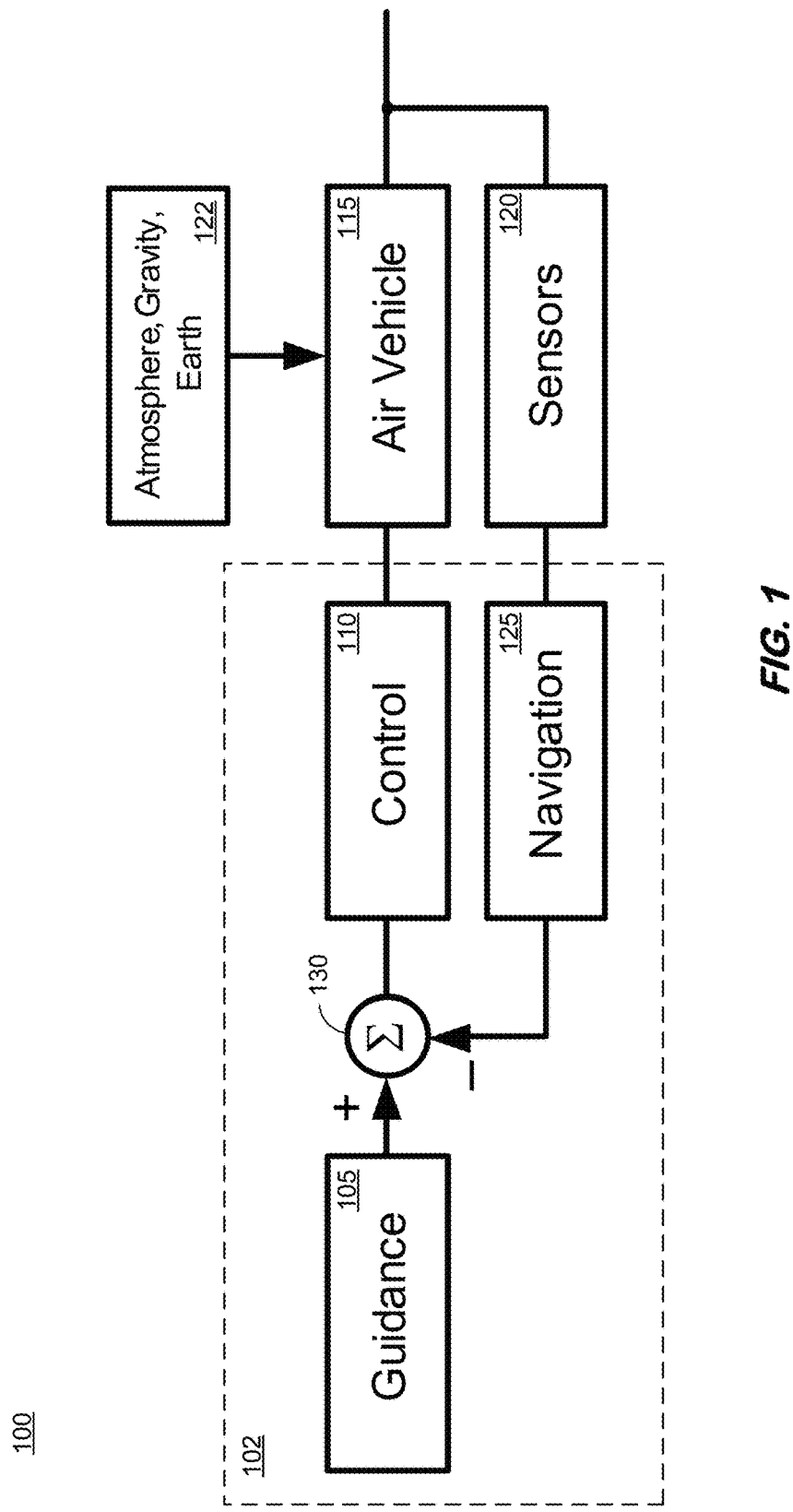
FIG. 1 shows one example embodiment of a schematic block diagram including some aspects of a flight control system for guidance and navigation of an aircraft, according to some aspects herein.

Referring to FIG. 1, an illustrative depiction of one example system for guidance and navigation of an aircraft is depicted. A guidance module 105, a control module 110, and a navigation module 125 may cooperate to form at least a portion of an onboard Flight Management System (FMS) 102 of a particular aircraft 115.

Control unit 110 may operate to control operations of aircraft 115 on which system 100 is installed. There may be one or more sensors 120 that are used to measure certain properties of the aircraft and/or the environment and operational parameters. Sensor data from sensors 120 is fed to a navigation module 125, which then feeds a FMS summation unit 130 that also receives inputs from guidance module 105 for feedback control of aircraft 115. In one example, guidance module 105 of system 100 optimizes the open-loop control and minimizes direct operating costs (DOC). The output of summation unit 130 is fed to control module 110. The control module provides feedback and control policies. In some instances, control module 110 may include an auto pilot/throttle (sub)system.

According to one embodiment, the present disclosure includes applying ground-based optimization technologies to generate a control history and corresponding state trajectory that can minimize DOC for an aircraft using a data link to the aircraft and ground-based computer systems having a processor executing program instructions embodied as systems, devices, and services. In some aspects, some of the systems and processes of the present disclosure offer greater computational capabilities as compared to systems onboard aircraft. Also, in some embodiments, there may be a greater connectivity between multiple ground-based systems acting together in one or more capacities as sources of data, data storage, and processing, as compared to aircraft onboard systems.

FIG. 2 is an illustrative flow diagram of one example embodiment of a process 200. Process 200 may be executed by a system, an apparatus, and combinations thereof, including distributed computing systems and networks. In some instances, a system or device having a processor may execute program instructions of, for example, an application or an "app" embodied as a tangible medium to effectuate the operations of process 200. In some embodiments, at least a portion of process 200 may be implemented by software components deployed as software as a service.

At operation 205, flight data for a prescribed flight is obtained. The data being obtained may be from either an airborne system of a particular aircraft to execute the prescribed flight or an external computational asset. In some aspects herein, an external computational asset refers to a device, system, and component having a central processing unit (i.e., processor) that is separate and distinct from a flight management and/or flight control system of an aircraft. In some embodiments, the computational processing power, processing speed, data access bandwidth capability, data processing capabilities, interconnectivity capabilities to other systems, and combinations thereof of an external computational asset herein may be greater than such features of an aircraft's on-board (i.e., native) flight management and flight control systems. An external computational asset herein may include the technical functionality to interface and communicate with other systems, including but not limited to, another external computational asset, flight management and flight control systems on-board an aircraft, and other types of systems via communication links (e.g., uplink, downlink) using different communication protocols and techniques. The enhanced operational features of an external computational asset herein relative to an aircraft's on-board system(s) may be leveraged in some embodiments of the present disclosure to determine a control solution that is improved, enhanced, and otherwise closer to optimum as compared to that which airborne system(s) of the aircraft alone can deliver.

In some embodiments, an external computational asset herein may include one or more systems, devices, subsystems, and components that are ground-based. A ground-based system herein may be a stand-alone system, device, or component such as, for example, a computer server, a distributed computing system. In some instances, an external computational asset herein, whether ground-based or otherwise, may be embodied, in part, as an application or as a service executed by hardware. In some embodiments, an external computational asset herein may include one or more systems, devices, subsystems, and components that are onboard a mobile platform, either ground-based, seaborne or airborne.

Whether the data is obtained from airborne system(s) of the particular aircraft or from one or more systems other than the airborne system(s) of the particular aircraft (e.g., any system, device, or component different than the airborne system(s) of the particular aircraft, either ground-based or otherwise including, for example, other mobile platforms), the flight data may include details relating at least one of the particular aircraft and the parameters of the prescribed flight. For example, the external computational asset maybe located on board the particular aircraft (but separate and distinct from the airborne system(s) thereof) and the flight data including details relating to the particular aircraft could be received from systems on the ground or on a mobile platform, via, for example in flight internet. By way of example, flight data including details relating to the particular aircraft may include specific characteristics for the particular aircraft. Examples might include tail specific characteristics of the aircraft, including, for example, accurate performance and operational values for the particular aircraft such as thrust, drag, etc. that can be based on actual historical performance, maintenance, and other types of data. Flight data including details relating to the parameters of the prescribed flight may include a filed (baseline) flight plan, nominal airplane characteristics for the particular aircraft (as opposed to actual characteristics for the specific, "particular" aircraft), and actual weather or environmental factors for the time the prescribed flight will be executed (as opposed to averaged weather conditions).

In some embodiments, at least some of the specific details of the flight data relating to the particular aircraft might include a data model, where the data model includes tail specific characteristics (i.e., performance and operational data relating specifically to the particular aircraft). The data model for the particular aircraft may include characteristics and parameters, including the values thereof that are specific to the particular aircraft. In part, the specific details may be based on a history of previous flights conducted by the particular aircraft.

A data model specifically and accurately reflecting the particular aircraft may be an optional feature of some embodiments herein. In some embodiments including tail specific characteristics for the particular aircraft, a data model (or any other data structure or construct) specifically and accurately reflecting the particular aircraft may be obtained or built, at least in part, by one or more ground-based systems. In some embodiments, a ground-based system may include a functionality to build a data model, a task that might be accomplished based on the computing resources and data accessibility of the ground-based system(s).

In some embodiments, the scope (i.e., level of detail and comprehensiveness) of the tail specific characteristics for the particular aircraft included in the flight data of operation 205 may be sufficient such that a data model (or other data structure) representing the air craft actually closely matches the real-life operating performance of the particular aircraft. Given a high level of correspondence between the data model and the operational performance of the particular aircraft, such an accurate data model is referred to herein as a "digital twin" of the particular aircraft. The digital twin includes an accurate and updated account of key characteristics/aspects of the particular aircraft. The scope and accuracy of a data model for the particular aircraft in some embodiments herein greatly contributes to the ability for process 200 to generate optimized path specific controls and an optimized trajectory. In some instances, the performance of an optimization realized by process 200 is enhanced and improved to achieve a lower DOC due to, at least in part, the use of a digital twin in some embodiments.

In some embodiments, data may be collected (i.e., observed, recorded, and maintained) for a specific aircraft over time. The detailed data collected (e.g., data including but not limited to thrust, drag, and other parameters) may be used to build an accurate data model for the particular aircraft. In some aspects, a data model for a particular aircraft herein may be repeatedly updated, at least periodically, as the particular aircraft is operated. The intervals of time regarding the updating may be triggered or invoked in response to a change in aircraft specific characteristic data, significant maintenance modifications, etc. In some use-cases, the updated data model may be used to perform a revised control optimization to generate updated optimized path specific controls for the prescribed flight.

The digital twin data model (or other configured representation thereof) is in contrast to previous, conventional systems and processes wherein aircraft avionics referenced and used static (e.g., lookup tables) data including averages or generic models and representations of an aircraft. Such generic aircraft representations do not reflect or capture how a specific aircraft can reliably be expected to perform under specific flight conditions at the time a specific prescribed flight mission is executed.

As such, the flight data may be received from the particular aircraft or some other system (e.g., an external computational asset, but not limited thereto). It is noted that the external computational assets, whether individually or collectively, might have greater computational capacity and functionality than an aircraft's onboard systems. In the event the flight data is generated, stored, or otherwise provided by the particular aircraft, this flight data can be communicated from the particular aircraft to an external computational asset herein via a communication link. In the instance the external computational asset is embodied in a ground-based system, the communication link between the particular aircraft and the ground-based external computational asset is referred to herein as a downlink. In a scenario or use-case where the external computational asset is also located on the particular aircraft (although separate and distinct therefrom) or on a different air or surface vehicle (e.g., an airborne aircraft or station that houses an external computational asset that supports that optimization of flight plans for a single or multiple aircraft), the communication link between the particular aircraft and the external computational asset may also be referred to herein as a downlink.

At operation 210, the data obtained at operation 205 may be processed by one or more external computational assets to perform a control optimization to generate optimized path specific controls for the prescribed flight. That is, an optimization to calculate the path specific controls for the prescribed flight are performed (i.e., executed) "off-board" of the particular aircraft's flight control and/or flight management system(s).

The optimized path specific controls generated at operation 210 may be transmitted to the particular aircraft via a communication link, wherein the optimized path specific controls are sent from the external computational assets to the particular aircraft's relevant system(s), as shown at operation 215 of process 200. This communication link to accommodate and support the transfer of data from the external computational asset to the particular aircraft is referred to herein as an uplink, as introduced above. In some embodiments, the optimized path specific controls sent to the aircraft via the uplink may be configured or packaged as a complete profile (i.e., flight plan) that can be readily processed for guidance by the particular aircraft. In some other embodiments, the optimized path specific controls may include, at least in part, control commands that in turn may be received and processed to construct a profile by the airborne systems on the particular aircraft.

Continuing to operation 220, the particular aircraft is guided to the path specified by the optimized path specific controls to execute the prescribed flight in a manner that minimizes the intended or target DOC. The optimized path specific controls may be used by the particular aircraft and the flight control system thereof to adjust operational and performance settings of the aircraft to achieve the prescribed flight in an efficient and cost-effective manner.

In some embodiments, data may be collected (i.e., observed, recorded, and maintained) for a specific aircraft over time. The detailed collected data (e.g., data including but not limited to thrust, drag, and other parameters) may be used to build an accurate data model for the particular aircraft. In some aspects, a data model for a particular aircraft herein may be repeatedly updated as the particular aircraft is operated. The intervals of time regarding the updating may be triggered or invoked in response to a change in aircraft specific characteristic data. The updated data model may be used to perform a revised control optimization to generate updated optimized path specific controls for the prescribed flight. The updated optimized path specific controls for the prescribed flight may be uplinked to the particular aircraft and used by a flight control system thereof to guide the particular aircraft.

FIG. 3 is an illustrative depiction of a framework or infrastructure 300 to facilitate and support the gathering of specific aircraft and flight data, performing flight path optimization calculations by external computational assets, and communicating the optimized command controls to the aircraft in an efficient and secure manner. In some regards, one or more features of the framework depicted in FIG. 3 may be compatible with some aspects and components of some legacy (i.e., existing) aircraft management systems.

Framework 300 may support the calculation of control histories that minimize one or more DOC of a particular aircraft. In general, framework 300 may operate to generate optimized flight paths by gathering flight parameters or data, as illustrated by the collective data 302 that may be downloaded from airborne system(s) of the aircraft via a downlink at 320 or by gathering data from one or more systems other than the airborne system(s) of the aircraft (e.g., an external computational asset, but not limited thereto) (s) as illustrated by the data collectively indicated at 304. The collective data 302 and the collective data 320 may both be downloaded from airborne system(s) or alternatively be gathered from the one or more systems other than the airborne system(s) of the aircraft.

In some instances, if an external computational asset (e.g., a ground-based system) is unavailable or the communication link therewith is not functioning, other aspects of some processes herein may still be performed by, for example, using an airborne-based optimization method.

In some embodiments, data 302 from airborne systems of an aircraft may include a filed flight plan for a flight or mission 305, nominal airplane characteristics 310, and some weather information 315, that may be collected by sensors located on the aircraft. This and other data from an aircraft related to the aircraft and its environment may be transmitted off-aircraft from the aircraft to one or more external computational assets via a communication link (i.e., referred to as a downlink herein) at 320. In some embodiments, onboard systems of the aircraft may employ data communication techniques and protocols to ensure the efficient transmission of data from the aircraft to the external computational assets, including but not limited to, various types of data buffering, compression, and encryption.

Data 304 gathered or received from one or more systems other than the airborne system(s) of the aircraft (e.g., an external computational asset, but not limited thereto) (s) may include various types of data related to a specific aircraft and flight or mission. For example, data 304 may include tail specific airplane characteristics data 325 for a particular aircraft (e.g., aircraft specific data including but not limited to, for example, thrust, drag, etc.), air traffic information 330 including a state of an air traffic control network relevant to an aircraft and a prescribed flight or mission for the aircraft (e.g., information that may be useful in avoiding/minimizing delays), enhanced weather information 335 (e.g., convective weather information to avoid storms, areas of potential icing and the like), and other data 340 (e.g., wind data aloft, etc.). Data 304 may be gathered in addition to data 302 collected, gathered, or received from an aircraft. Each type of data comprising the collective data 304 may contribute to the technical improvements provided by framework 300, although the combination of one or more of the data types 325, 330, 335, and 340 may result in contributions not realized by any one of the data types alone.

Framework 300 may further perform a control optimization on the external computational asset and predict a state trajectory (i.e., flight path) for the particular aircraft (350); communicate (i.e., uplink) the optimized flight plan to the aircraft (355); and guide the airplane according to the optimal control (365).

At 350, an optimization is performed by an external computational asset including one or more processors using data 302 from the particular aircraft and data 304 received from one or more the one or more systems other than the airborne system(s) of the aircraft (e.g., an external computational asset, but not limited thereto). It is noted that the determination of optimized specific path controls at 350 is performed for a specific aircraft executing a specific flight at a specific time. As such, values and commands for the particular aircraft of the present example are not simply available in a static lookup table or other pre-determined record. The optimization performed at 350 is dynamic in the sense that it is determined for a specific aircraft executing a specific flight at a specific time and can further be updated over a period of time as additional information can be collected and recorded for the particular aircraft and other data is updated as changes may occur (e.g., the state of the air traffic network may change, the weather information 335 may change, etc.).

In some respects, the external computational asset-, offline calculations performed at 350 can result in a more sophisticated understanding and view of relevant weather considerations (e.g., temperature and wind aloft, etc.). By making use of this additional scope of information, as well as a greater connectivity to systems other than the airborne system(s) of the aircraft (e.g., an external computational asset, but not limited thereto) having additional information, storage, databases, and processing capabilities of data, determinations of optimized path specific controls are enabled.

In some embodiments or instances, the performance of the optimization by an external computational asset at 350 may yield optimized path specific control commands. These optimized path specific control commands may be used to determine an optimized flight plan profile that can be sent to the particular aircraft via an uplink communication link at 355, wherein the profile may be stored for a future guidance use.

In some regards, sending an optimized profile to an airborne aircraft via a wireless uplink (or possibly wired where the external computational asset is located with a particular aircraft) communication channel in a timely and efficient manner may require a relatively large bandwidth. In some embodiments, the optimized profile may be condensed using one or more data and/or communication techniques. In some embodiments, the optimized path specific control commands determined at 350 may be sent to the particular aircraft as one or more listing of commands (e.g., speed commands, altitude commands, etc.) that may consume very little bandwidth. The optimized path specific control commands sent to the aircraft may be used to (re)construct, build, or otherwise generate an optimized flight plan (profile) on the particular aircraft that will execute the prescribed flight based on the commands.

In some instances, the external computational asset-based system may initially construct the profile at 350 and the profile may be deconstructed into its optimized path specific control commands in response to, for example, a limited uplink bandwidth, wherein the optimized path specific control commands are sent to the particular aircraft as a basis for the reconstruction of the profile. In some embodiments, an external computational asset in framework 300 may be capable of sending an optimized profile, the optimized path specific control commands, and combinations thereof.

In some embodiments, framework 300 and other aspects herein may optionally support and facilitate a trajectory negotiation on the ground with air traffic controllers (or other entities), instead of directly with an aircraft, for a set of multiple aircraft. Based on obtained flight data and at least some aspects of the negotiated trajectory for the set of aircraft, a control optimization can be performed to generate optimized path specific controls for the set of aircraft.

In some aspects, framework 300 may also support and facilitate the recording of flight data (e.g., 325, 330, 335, and 340) for a period of time sufficient by one or more external computational assets or service providers to develop an accurate model of the performance of an individual, particular aircraft (i.e., digital twin); use the gathered flight data to identify (i.e., create) the digital twin; update the digital twin data on an ongoing basis, (either continuously or at least periodically) to identify changes in the aircraft performance; use the digital twin as the performance model in a cost-optimizing function 350 (e.g., altitude and speed along a lateral path that may be constrained to comply with Instrument Flight Rules); and transmit the optimized control commands via an uplink (355) to airborne automation systems of the particular aircraft for execution and guidance (360, 365).

In some embodiments, the updating and use of the digital twin data model to obtain optimized control commands (350) and the transmission (355) of same to the particular aircraft may be repeatedly performed for each flight. These operations may be performed using an external computational asset that technically addresses the problem of real-time flight path optimization for operating aircraft by using external computational assets having the resources of large data storage, processing, and accessibility capabilities, where the data might include, for example, weather information 335 (e.g., relevant convective weather states for a specific flight or mission), airspace constraints and air traffic information 330, and other types of data 340 that may not necessarily be available to an airborne system as efficiently and/or robust, if at all.

In some instances, a transmission of the optimized control may occur via a wired connection or network when a particular aircraft is on the ground (e.g., prior to takeoff) and/or the external computational asset is located on the particular aircraft or it may occur via a wireless transmission network during flight (e.g., when condition changes). In some regards, the particular communication technology may be varied and modified to facilitate communication between the external computational assets, ground-based data sources and computing systems, and aircraft, including a translation or transformation of communication messages from one or more formats to other formats. In some regards, a system and a process herein may include functionality and provisions to ensure that the validity of data, as well as the integrity of at least the data communicated to an aircraft as optimized command controls and/or profiles is established and maintained. The data uplinked (at least) to an aircraft may be encrypted using or more security techniques and protocols, including those now known and those that become known in the future.

FIG. 4 is an illustrative block diagram of apparatus 400 according to one example of some embodiments. Apparatus 400 may comprise a computing apparatus and may execute program instructions to perform any of the functions described herein. Apparatus 400 may comprise an implementation of server, a dedicated processor-enabled device, and other systems, including aircraft deployed systems and systems deployed in, for example, an external computational asset or facility, in some embodiments. Apparatus 400 may include other unshown elements according to some embodiments.

Apparatus 400 includes processor 405 operatively coupled to communication device 415 to communicate with other systems, data storage device 430, one or more input devices 410 to receive inputs from other systems and entities, one or more output devices 420 and memory 425. Communication device 415 may facilitate communication with external devices, such as other external computational assets, an air traffic control network, and an aircraft. Input device(s) 410 may comprise, for example, a keyboard, a keypad, a mouse or other pointing device, a microphone, knob or a switch, an infra-red (IR) port, a docking station, and/or a touch screen. Input device(s) 410 may be used, for example, to enter information into apparatus 400. Output device(s) 420 may comprise, for example, a display (e.g., a display screen) a speaker, and/or a printer.

Data storage device 430 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory.

Optimization engine 435, aircraft data modeler 440, and application 445 may comprise program instructions executed by processor 405 to cause apparatus 400 to perform any one or more of the processes described herein, including but not limited to aspects disclosed in FIGS. 2 and 3. Embodiments are not limited to execution of these processes by a single apparatus.

Data 450 (either cached or a full database) may be stored in volatile memory such as memory 425. Data storage device 430 may also store data and other program code for providing additional functionality and/or which are necessary for operation of apparatus 400, such as device drivers, operating system files, etc. Data 450 may include performance data related an aircraft that may be used in future data modeling of the aircraft for optimization purposes.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method implemented by a processor of a computing system to optimize aircraft guidance to minimize direct operating cost of a prescribed flight, the method comprising:
    obtaining flight data for a prescribed flight from at least one of an airborne system of a particular aircraft to execute the prescribed flight and a system separate and distinct from the airborne system having a source of data related to the prescribed flight, the flight data including specific details relating to the particular aircraft and parameters of the prescribed flight, the specific details of the flight data relating to the particular aircraft comprises a data model including tail specific performance and operational characteristics for the particular aircraft;
    performing, by a processor of an external computational asset separate and distinct from a flight management system and a flight control system of the airborne system and based on the obtained flight data, a control optimization to generate optimized path specific control commands to minimize at least one direct operating cost for the prescribed flight;

transmitting the optimized path specific control commands via a communication uplink from the external computational asset to the particular aircraft; and guiding, in response to receiving the optimized path specific control commands by the particular aircraft, the particular aircraft in accordance with the optimized path specific control commands to execute the prescribed flight to minimize the at least one direct operating cost for the prescribed flight.

2. The method of claim 1, wherein the prescribed flight is specified by a baseline flight plan for the particular aircraft.

3. The method of claim 1, wherein the tail specific performance and operational characteristics for the particular aircraft includes at least one of a drag parameter and a thrust parameter.

4. The method of claim 1, wherein the system separate and distinct from the airborne system having a source of data related to the prescribed flight comprises more than one system, device, or component external computational asset.

5. The method of claim 1, wherein the source of data related to the prescribed flight for a ground-based system is at least one of convective weather data, wind and temperature aloft data, air traffic control constraints and traffic flow state information, to an extent each is relevant to the prescribed flight.

6. The method of claim 1, further comprising:
at least periodically obtaining an update of the flight data for the prescribed flight;
performing, by the processor of the external computational asset and based on the obtained updated flight data, a revised control optimization to generate updated optimized path specific controls for the prescribed flight;
transmitting the updated optimized path specific controls via the communication uplink from the external computational asset to the particular aircraft; and
guiding, in response to receiving the updated optimized path specific controls by the particular aircraft, the particular aircraft in accordance with the updated optimized path specific controls to execute the prescribed flight.

7. The method of claim 6, wherein the performing of the revised control optimization is invoked in response to changes in the obtained flight data.

8. The method of claim 1, further comprising:
receiving, by the particular aircraft, the optimized path specific control commands, the optimized path specific control commands comprising a listing of control commands including speed commands; and
generating, by an airborne system on the particular aircraft based on the received optimized path specific control commands, an optimized flight path for the particular aircraft to execute the prescribed flight.

9. The method of claim 1, further comprising:
receiving, for a set of aircraft including a plurality of aircraft, at least some aspects of a trajectory negotiated by an external computational asset with an air traffic control entity for the set of aircraft; and
performing, by the processor of the external computational asset based on the obtained flight data and the at least some aspects of the negotiated trajectory for the set of aircraft, a control optimization to generate optimized path specific controls for the set of aircraft.

10. A system comprising:
an external computational asset device comprising:
a memory storing processor-executable program instructions; and
a processor to execute the processor-executable program instructions to cause the computing device to:
obtain flight data for a prescribed flight from at least one of an airborne system of a particular aircraft to execute the prescribed flight and a system separate and distinct from the airborne system having a source of data related to the prescribed flight, the flight data including specific details relating to the particular aircraft and parameters of the prescribed flight, the specific details of the flight data relating to the particular aircraft comprises a data model including tail specific performance and operational characteristics for the particular aircraft;
perform, by the processor of the external computational asset separate and distinct from a flight management system and a flight control system of the airborne system and based on the obtained flight data, a control optimization to generate optimized path specific control commands to minimize at least one direct operating cost for the prescribed flight;
transmit the optimized path specific control commands via a communication uplink from the external computational asset to the particular aircraft; and
guide, in response to receiving the optimized path specific control commands by the particular aircraft, the particular aircraft in accordance with the optimized path specific control commands to execute the prescribed flight to minimize the at least one direct operating cost for the prescribed flight.

11. The system of claim 10, wherein the prescribed flight is specified by a baseline flight plan for the particular aircraft.

12. The system of claim 10, wherein the tail specific performance and operational characteristics for the particular aircraft includes at least one of a drag parameter and a thrust parameter.

13. The system of claim 10, wherein the system separate and distinct from the airborne system having a source of data related to the prescribed flight comprises more than one system, device, or component external computational asset.

14. The system of claim 10, wherein the source of data related to the prescribed flight for a ground-based system is at least one of convective weather data, wind and temperature aloft data, air traffic control constraints and traffic flow state information, to an extent each is relevant to the prescribed flight.

15. The system of claim 10, wherein the processor further executes the processor-executable program instructions to cause the computing device to:
at least periodically obtain an update of the flight data for the prescribed flight;
perform, based on the obtained updated flight data, a revised control optimization to generate updated optimized path specific controls for the prescribed flight;
transmit the updated optimized path specific controls via the communication uplink from the external computational asset to the particular aircraft; and
guide, in response to receiving the updated optimized path specific controls by the particular aircraft, the particular aircraft in accordance with the updated optimized path specific controls to execute the prescribed flight.

16. The system of claim 15, wherein the performing of the revised control optimization is invoked in response to changes in the obtained flight data.

17. The system of claim 10, further comprising:
receiving, by the particular aircraft, the optimized path specific control commands, the optimized path specific control commands comprising a listing of control commands; and
generating, by an airborne system on the particular aircraft based on the received optimized path specific control commands, an optimized flight path for the particular aircraft to execute the prescribed flight.

18. The system of claim 10, wherein the processor further executes the processor-executable program instructions to cause the computing device to:
receive, for a set of aircraft including a plurality of aircraft, at least some aspects of a trajectory negotiated by an external computational asset with an air traffic control entity for the set of aircraft; and
perform, by the processor of the external computational asset based on the obtained flight data and the at least some aspects of the negotiated trajectory for the set of aircraft, a control optimization to generate optimized path specific control commands for the set of aircraft.

* * * * *